United States Patent [19]

Kirby

[11] 4,193,472
[45] Mar. 18, 1980

[54] OPEN-ENDED SEISMIC SOURCE

[75] Inventor: Robert A. Kirby, Houston, Tex.

[73] Assignee: Exxon Production Research Company, Houston, Tex.

[21] Appl. No.: 926,671

[22] Filed: Jul. 21, 1978

[51] Int. Cl.² .......................... G01V 1/38; G01V 1/10
[52] U.S. Cl. ..................................... 181/118; 367/147
[58] Field of Search ................ 340/7 R, 12 R, 12 SD; 181/113, 118

[56] References Cited

U.S. PATENT DOCUMENTS

| | | | |
|---|---|---|---|
| 2,994,397 | 8/1961 | Huckaboy | 340/12 SD |
| 3,048,816 | 8/1962 | Lubrow | 181/110 |
| 3,256,952 | 6/1966 | Cuder et al. | 181/118 |
| 3,397,755 | 8/1968 | Loper | 340/7 R |
| 3,588,801 | 6/1971 | Leonard | 340/12 R |
| 3,951,231 | 4/1976 | Leonard | 181/118 |

OTHER PUBLICATIONS

Cook, "Report On a Visit to the . . . Grand Banks", 6/13/65, 9 pages, Imperial Oil Limited Report.
Bayhi, "Offshore Demonstration of GSI Gas Exploder", 3/1/66, 5 pages, Exxon Prod. Res. memorandum.

Primary Examiner—Nelson Moskowitz
Attorney, Agent, or Firm—George E. Glober

[57] ABSTRACT

An open-ended seismic source for use in a liquid medium such as water is disclosed. The source includes a source of explosive gas, a firing chamber connected to the source, a capacitor discharge ignition system connected to the firing chamber for igniting the gas in the firing chamber, a barrel connected to the firing chamber, defining an explosion chamber and having an outlet at its lower end, a plurality of baffle plates fixed in the barrel near the outlet for permitting the exploded gas to enter the medium and for retarding the entry of the medium into the barrel, and a reaction plate attached to the barrel and disposed below the outlet so that the exploded gas entering the medium impinges on the plate and the recoil of the barrel is reduced.

16 Claims, 3 Drawing Figures

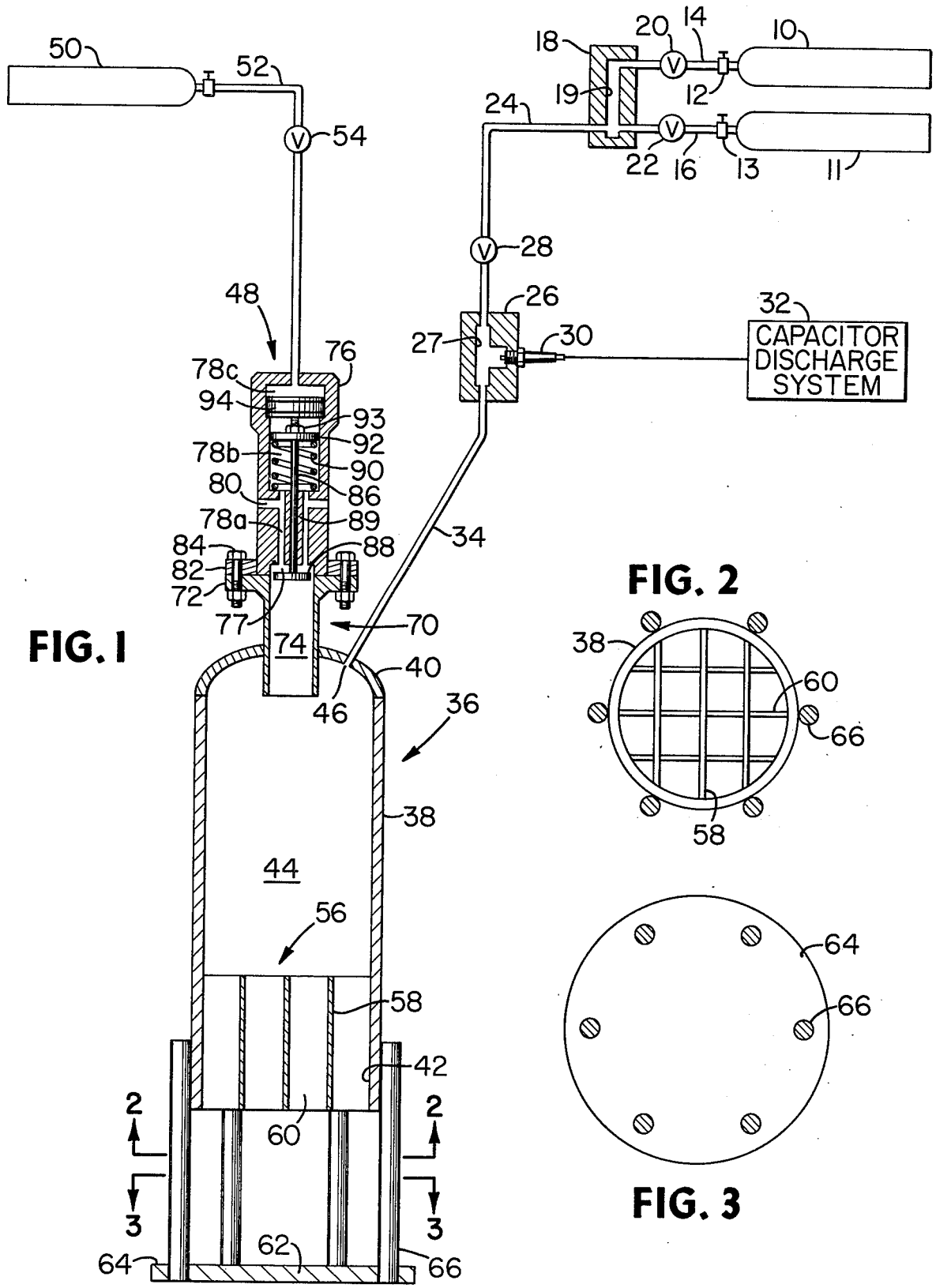

OPEN-ENDED SEISMIC SOURCE

BACKGROUND OF THE INVENTION

1. Field of the Invention

This invention relates to improvements in seismic energy sources used to create pulses in a liquid medium such as water. More particularly, it relates primarily to improvements in such seismic sources which create pulses in the medium by the detonation of explosive gas in an explosion chamber which communicates directly with the medium.

2. Description of the Prior Art

In prospecting in subsea areas and in other earth formations underlying bodies of water, it is desirable to provide a source of energy for introducing pulses or waves into the water. These waves propagate through the water, enter the underlying formation, are reflected in part by discontinuities in the formation, and subsequently propagate back through the water and are detected by geophones and other measuring devices at or near the water's surface. The characteristics of the reflected waves are compared with the characteristics of the waves at or near their introduction into the water. This comparison reveals valuable information about the structure of the underlying formation and the probability of the presence of petroleum accumulations in the formation.

It has become common to use seismic sources known as gas guns to induce pulses of desired characteristics in the liquid medium. These guns operate by abruptly introducing under high pressure bubbles of compressed air or other gaseous material into the liquid medium, thereby generating a pulse in the medium, or by abruptly expanding a flexible member in contact with the medium, thereby generating a pulse in the medium. An example of the former type of gun is shown in U.S. Pat. No. 3,397,755 (1968) to Loper; an example of the latter type of gun is shown in U.S. Pat. No. 3,658,149 (1972) to Neal et al.

This invention is directed to guns of the former type, and in particular, primarily to guns which achieve the abrupt introduction of high pressure gas into the medium through the detonation of explosive gas in an explosion chamber which communicates with the medium. U.S. Pat. No. 3,397,755 illustrates a subsea seismic source in which a valve is interposed between the chamber of the gun and the liquid medium and the release of the gas to the medium is controlled by the valve. It is also well known in the art to make and use open ended gas guns in which no valve is interposed between the chamber and the medium, but instead the chamber communicates directly with the medium through a section of open pipe or other outlet which remains open continually. Such open ended gas guns have certain advantages of simplicity of construction, operation and maintenance over gas guns with valves which control the release of the gas into the medium. However, an open ended gas gun can have the disadvantage that in operation, as it is moved through the liquid medium, eddy currents are created in the medium, so that the medium enters the explosion chamber and interferes with the introduction and detonation of the explosive gas.

A further disadvantage of gas guns, whether open ended or not, is that the detonation or release of the gas and subsequent abrupt introduction of the gas into the medium can create a recoil of the barrel of the gun. This recoil, depending on the mass of the barrel, the magnitude of the detonation and other factors, may be damaging to the equipment and dangerous. Leonard proposes in U.S. Pat. Nos. 3,588,801 (1971) and 3,951,231 (1976) eliminating or reducing the recoil by closing the end of the barrel and providing a series of side ports to permit the discharge of the gas into the medium. While this technique may reduce or eliminate the recoil, it also greatly reduces the efficiency of the transfer of energy to the medium.

SUMMARY

In order to permit the gas to pass freely from a chamber in the gun through an outlet in the gun into the medium, but also to retard the entry of the medium into the chamber, baffle plates are fixed near the outlet. These baffle plates are aligned so that they permit the efficient discharge of the gas into the medium, but retard the entry of the medium into the chamber.

In order to reduce the recoil of the gun upon release of the gas into the medium and simultaneously to permit the efficient entry of the gas into the medium, a reaction plate is fixed to the gun adjacent to the outlet through which the gas passes, so that gas passing through the outlet impinges upon the reaction plate. The plate is fixed to the gun by relatively thin rods which provide relatively slight interference with the passage of the gas into the liquid medium. Because the gas diffuses as it leaves the outlet, the surface area of the face of the reaction plate is designed to exceed the cross-sectional area of the outlet. Thus, the reaction plate reduces the recoil to acceptable levels while maintaining the efficient transfer of the energy of the detonation to the liquid medium.

BRIEF DESCRIPTION OF THE DRAWINGS

In the drawings, wherein like reference numerals indicate like parts and wherein illustrative embodiments of this invention are shown:

FIG. 1 is a simplified representation partly schematic and partly in vertical cross-section of an open-ended seismic source embodying the invention;

FIG. 2 is a view taken along line 2—2 in FIG. 1; and

FIG. 3 is a view taken along line 3—3 in FIG. 1.

DESCRIPTION OF THE PREFERRED EMBODIMENTS

FIG. 1 is a simplified representation of an open-ended gas gun embodying the invention.

The gun includes a tank 10 of oxygen and a tank 11 of propane, with pressure regulators 12 and 13 respectively, connected by conduits 14 and 16 respectively to a mixing block 18. Mixing block 18 defines a mixing chamber 19 for blending the gases to form an explosive mixture. Valves 20 and 22 are disposed in conduits 14 and 16 respectively to meter the oxygen and propane as desired. Any suitable valves may be used; in practice the V5 Series two-way normally closed solenoid valves by Skinner Precision Industries, Inc. of New Britain, Conn. have been acceptable.

Mixing block 18 is connected by conduit 24 to firing block 26 defining a firing chamber 27. A back-fire preventer 28 may be disposed in conduit 24 for the purpose of preventing the fire front from spreading to the mixing block 18 when the gas is ignited in the firing chamber 27.

A spark plug 30 extends through the wall of firing block 26 into firing chamber 27 and is connected to a capacitor discharge system 32. At desired time intervals discharge system 32 causes spark plug 30 to fire and ignite the gas in firing chamber 27.

Conduit 34 communicates between firing chamber 27 and the gun barrel 36. In the preferred embodiment gun barrel 36 comprises an elongated cylindrical member or pipe 38 having a cap 40 closing its upper end, defining an outlet 42 at its lower end and defining an explosion chamber 44 between cap 40 and outlet 42. However, it will be appreciated that the barrel need not be formed of a pipe and cap and in fact need not be cylindrical, so long as it defines a suitable explosion chamber for the gases and provides a suitable outlet for the gases between the chamber and the medium. In FIG. 1 a single passage 46 in cap 40 for receiving the lower end of conduit 34 is shown. If desired, a plurality of passages (not shown) could be formed in cap 40 to provide alternate means for receiving conduit 34 and thereby facilitate the connection of conduit 34 to cap 40. Naturally those passageways would be blocked off when not in use.

Valve 48 is mounted on cap 40 and serves to vent into the water the residual gases left in chamber 44 after an explosion and thus may be said to be a means for venting residual gas from the explosion chamber. The details of the operation of valve 48 will be discussed below. However, briefly the valve is controlled by a tank 50 of compressed air connected to valve 48 by conduit 52 and by valve 54 disposed in conduit 52 between the tank 50 and valve 48.

Barrel 36 is designed to be placed underwater so that its longitudinal axis is substantially vertical and to towed through the water so that its line of travel through the water is substantially perpendicular to its longitudinal axis. In such event eddy currents tend to form in the water around outlet 42 and water tends to enter the barrel through outlet 42. This entry of water into the barrel is undesirable because it interferes with the introduction of gas into chamber 44 and with the detonation of that gas. In order to retard such entry of water, a baffle indicated generally at 56 is fixed in the lower end of the barrel. In the preferred embodiment, this baffle comprises a set of baffle plates 58 and a set of baffle plates 60 welded into place in pipe 38. All baffle plates are fixed so that their planes are substantially parallel to the flow of gas through the outlet. Further, the planes of one set of plates are perpendicular to the planes of the other set of plates, so that the baffle will be effective as the barrel is rotated about its central longitudinal axis. It will be appreciated that the baffle need not comprise a plurality of mutually perpendicular plates to come within the spirit of the invention. In fact, any suitable baffle which permits the flow of gas through outlet 42 and which retards the flow of water into the barrel will serve the purpose. For example, the baffle could comprise one or more pipes of diameters smaller than the diameter of pipe 38 and fixed in the lower end of pipe 38 (either concentrically or not), so that their longitudinal axes are parallel with that of pipe 38. Further, while the baffle is shown in the preferred embodiment to be wholly within the barrel, clearly it could project from the barrel or be disposed outside of the barrel and still come within the spirit of the invention.

When the gas in chamber 44 is detonated and enters the water, the barrel 36 will recoil in accordance with Newton's third law of motion. This recoil is undesirable, because it can be dangerous and can damage the equipment. In order to attenuate the recoil, a reaction plate 62 having a face 64 is disposed outside the barrel adjacent to outlet 42 and is attached to the barrel by rods 66 which extend from the lower end of the barrel downwardly to the reaction plate. Reaction plate 62 is spaced from outlet 42 so that the gas escaping through the outlet 42 upon detonation enters the water and impinges upon face 64, whereby the recoil of the barrel is reduced. It is preferable, but not essential, that the plane of plate 62 be substantially perpendicular to the central longitudinal axis of the barrel and that said axis pass through the approximate center of said plate 62.

The upper ends of rods 66 are fixed to the lower outside surface of barrel 36 by welding or other suitable means and the lower ends of rods 66 are fixed by similar means to plate 62. The longitudinal axes of rods 66 are substantially parallel to each other and to the logitudinal axis of barrel 38. While the preferred embodiment of the invention includes the rods as just described, it will be appreciated that many other means for fixing the reaction plate to the barrel would fall within the spirit of the invention. However, it is desirable to keep such means relatively thin, so that there will be efficient entry of the exploded gas into the water and thus efficient creation of a seismic pulse in the water. Preferably the length of rods 66 is set so that the reaction plate is close enough to outlet 42 effectively to reduce the recoil, but far enough away to permit the efficient entry of the gas into the water. In the preferred embodiment, the barrel is about 21 inches (53 cm.) long and about 8 inches (20 cm.) in diameter; six rods, each about 1 inch (2.5 cm.) in diameter are provided; and the reaction plate is spaced about 7 inches (18 cm.) from the outlet. However, clearly these parameters may be changed without departing from the spirit of the invention.

As the gas escapes through outlet 42 upon detonation, it will diffuse before it impinges upon face 64 of reaction plate 62. For this reason, the surface area of face 64 (or of the horizontal cross-section of plate 62) is greater than the cross-sectional area of outlet 42. In the preferred embodiment, the reaction plate is about 12 inches (31 cm.) in diameter, so that the horizontal cross-sectional area of the plate is slightly greater than twice that of the outlet. However, clearly outlets and plates of other dimensions could fall within the scope of the invention.

Attention is now directed to the details of valve 48, which is provided for the purpose of venting the residual gas from chamber 44 between explosions and which for clarity is shown in FIG. 1 in somewhat enlarged relationship with respect to barrel 36. In order to provide a means for attaching valve 48 to cap 40, an upstanding cylindrical member 70 with annular flange 72 at its top extends through and is attached to cap 40 by suitable means such as welding. Cylindrical member 70 provides a vertical passageway 74 between chamber 44 and valve 48. Valve 48 comprises a generally cylindrical body 76 which defines a central, longitudinal, cylindrical passageway therethrough. This passageway has a lower inlet 77, a lower passageway section 78a, a middle passageway section 78b, and an upper passageway section 78c. Passageway 74 has a greater diameter than passageway section 78a and passageway section 78b has a greater diameter than passageway section 78a and passageway section 78c has a greater diameter than passageway section 78b, in order to permit the proper cooperation of certain moveable components which will be described below. Ports 80 communicate between lower passageway section 78a and the water and thus provide paths for the residual gas to enter the water. Annular flange 82 is secured to the bottom end of valve body 76 and is designed to match flange 72 and to be secured thereto by bolts 84 so that valve 48 is mounted on cap 40 with passageway 74 aligned with and in communication with the longitudinal passageway through valve body 76. For the purpose of alternately opening and closing the inlet 77, which has a circular cross-section, a rod 86 having a circular plate 88 attached to its lower end is slideably disposed in the longitudinal passageway though valve body 76. Plate 88 has a larger diameter than inlet 77. When rod 86 and plate 88 are in their lower or open position (shown in FIG. 1), gas may flow through passageway 74, inlet 77, passageway 78a and ports 80 into the water. When rod 86 and plate 88 are in their upper or closed position, plate 88 blocks the passage of gas through inlet 77. To enhance the seal between plate 88 and valve body 76 an O-ring is placed around inlet 77. To maintain rod 86 in proper alignment within the valve body 76, an annular guide sleeve 89 is fixed in passageway section 78a so that rod 86 slides through sleeve 89. In order to urge rod 86 and plate 88 into the closed position, a coil spring 90 is placed around rod 86 in passageway section 78b. This spring 90 presses up on annular plate 92 which is disposed around the upper end of rod 86 between the spring 90 and a nut 93 fixed to the top of rod 86. To provide a means for overcoming the upward pressure of spring 90 when it is desired to move rod 86 and plate 88 to their open position, a piston 94 is slideably disposed in passageway section 78c. Piston 94 is not attached to rod 86, but can press down on the top of rod 86. To improve the seal between piston 94 and valve body 76, O-rings are provided around piston 94. Normally spring 90 will urge rod 86 and plate 88 upwardly to close inlet 77 so that no gas can escape through cap 40. After an explosion, valve 54 is actuated to permit compressed air from tank 50 to flow through conduit 52 and impinge on the top of piston 94, moving rod 86 and plate 88 downwardly as spring 90 compresses, so that residual gases can flow from chamber 44, through passageway 74, inlet 77, passageway section 78a, and ports 80 into the water. Normally the hydrostatic pressure of the water will be sufficient to move the residual gases through valve 48 when it is opened. Valve 54 can be any suitable type. In practice the V5 Series three way valves by Skinner Precision Industries, Inc. of New Britain, Conn. have been found to be acceptable. While the preferred embodiment of the invention includes the valve 48 as described, it will be appreciated that many equivalent means for venting residual gases from chamber 44 could be used within the spirit of the invention.

In operation, one or more gun barrels 36 and ancillary equipment are disposed below the water surface and moved through the water at a desired depth and velocity. The barrels may be mounted on an underwater sled or held by other means well known in the art. Generally the barrels will be held so that their longitudinal axes are substantially vertical and, as the barrels move through the water, eddy currents will form around the barrels, but the entry of water into chamber 44 will be inhibited or retarded by baffles 56. When a seismic pulse is desired, gases from tanks 10 and 12 will be metered through valves 20 and 22 to obtain a desired stoichiometric mixture in mixing block 18 and will then pass through conduit 24 and backfire preventer 28 to firing chamber 27 and through conduit 34 to explosion chamber 44. Valve 48 will be in the closed position. When desired, a trigger pulse will be sent to ignition system 32, resulting in the firing of spark plug 30 and detonation of the gas in firing chamber 27. The ensuing flame front will be blocked by backfire preventer 28, but will travel down conduit 34 and will detonate the gas in chamber 44. Thus, firing chamber 27, spark plug 30, capacitor discharge system 32 and conduit 34 may be said to constitute means for detonating the explosive gas in chamber 44. In fact, viewed broadly the explosion mechanism and related equipment may be said to constitute a means for abruptly increasing the pressure of the gas in the chamber. This gas will escape through outlet 42, impinge on plate 62, thus reducing the recoil, and enter the surrounding water through rods 66, thus creating a seismic pulse. A signal is then sent to valve 54 and air under pressure in tank 50 is transmitted through conduit 52 to open valve 48 and thus permit the residual gases to escape to the water through ports 80.

From the above, it can be seen that the invention accomplishes its objects. The advantages of an efficient open-ended gas gun are achieved without the disadvantage of entry of the water into the explosion chamber. The recoil of the barrel is reduced and yet the gas passes efficiently into the water between rods 66 and creates the desired pulse. While the preferred embodiment involves mixing a plurality of different gases in a mixing block, it can be appreciated that the gases could be mixed in the explosion chamber or that a single explosive gas could be used. Further, while the preferred embodiment involves a firing chamber separate and distinct from the explosion chamber, the ignition of the gas could be accomplished in the explosion chamber. Further, the invention could be practiced by the use of non-explosive gas abruptly introduced under high pressure into the gun barrel. Thus, the foregoing disclosure and description of the invention are illustrative and explanatory thereof, and various changes in the size, shape and materials, as well as in the details of the illustrated construction may be made within the scope of the appended claims without departing from the spirit of the invention.

I claim:

1. An apparatus for generating pulses in a liquid medium, said apparatus comprising:
    a barrel defining a chamber which holds gas and which has an outlet communicating between the chamber and the medium;
    means for abruptly increasing the pressure of the gas in the chamber so that at least some of said gas escapes from the chamber through the outlet into the medium and creates a pulse in the medium; and
    a reaction plate having a face and being connected to the barrel and disposed outside the barrel adjacent to and spaced from the outlet so that gas escaping through the outlet impinges upon the face of said reaction plate, said face having a surface area greater than the cross-sectional area of said outlet, whereby the recoil of the barrel caused by the escaping gas is reduced.

2. The apparatus of claim 1, wherein the surface area of said reaction plate face is at least twice the cross-sectional area of said outlet.

3. The apparatus of claim 1, wherein the surface area of said reaction plate face is approximately twice the cross-sectional area of said outlet.

4. An open ended seismic gas gun for generating pulses in a liquid medium, said gun comprising:
   a cylindrical barrel having an upper end which is substantially closed and a lower end which is substantially open, so that the barrel defines a chamber with a circular outlet communicating between the chamber and the medium;
   a source of explosive gas connected to said chamber so that said explosive gas may be introduced into said chamber;
   means for detonating the explosive gas in the chamber;
   means for venting residual gases from the chamber after said explosive gas is exploded;
   a baffle fixed in the lower end of said cylindricl barrel, said baffle comprising a plurality of plates which permit the passage of gas through the lower end and which retard the introduction of said liquid medium into the chamber as the barrel is moved through the medium; and
   a circular reaction plate connected to the cylindrical barrel and held below the barrel and adjacent to the circular outlet so that gas escaping through the outlet upon explosion creates a seismic pulse in the liquid medium and also impinges upon the plate to reduce the recoil of the barrel.

5. The gun of claim 4, wherein said source comprises a plurality of tanks of gas which are explosive when mixed together and a mixing block connected to said tanks and to said chamber.

6. The gun of claim 4, wherein said means for detonating the explosive gas includes a capacitor discharge ignition system.

7. The gun of claim 4, wherein said means for venting said residual gases includes an air operated exhaust valve.

8. The gun of claim 4, wherein circular reaction plate is connected to said body by a plurality of rods fixed at their upper ends to the lower end of the cylindrical barrel and at their lower ends to said plate.

9. The gun of claim 8, wherein the horizontal cross-sectional area of said plate is approximately two times the cross-sectional area of said outlet.

10. An apparatus for generating pulses in a liquid medium, said apparatus comprising:
   a barrel defining a chamber adapted to hold explosive gas, said barrel having an outlet communicating between the chamber and the medium;
   a source of explosive gas connected to said chamber so that said explosive gas may be introduced into said chamber;
   means for detonating said explosive gas in said chamber; and
   a reaction plate having a face and being connected to the barrel and disposed outside the chamber adjacent to and spaced form the outlet so that the gas escaping through the outlet upon detonation of the gas impinges upon the face, the surface area of said face being greater than the cross-sectional area of said outlet,
   whereby the detonation of the gas creates a seismic pulse in the medium and the recoil of the barrel is reduced.

11. The apparatus of claim 10, wherein the surface of said reaction plate face is approximately twice the cross-sectional area of said outlet.

12. The apparatus of claim 10, wherein the surface area of said reaction plate face is at least twice the cross-sectional area of said outlet.

13. The apparatus of claim 10, wherein the reaction plate is connected to the barrel by at least one rigid rod.

14. An apparatus for generating pulses in a liquid medium, said apparatus comprising:
   a barrel defining a chamber adapted to hold explosive gas, said barrel having an outlet communicating between the chamber and the medium;
   a source of explosive gas connected to said chamber so that said explosive gas may be introduced into said chamber;
   means for detonating said explosive gas in said chamber; and
   a baffle disposed near the outlet to permit the passage of the gas through the outlet and to inhibit the introduction of the liquid medium into the chamber as the barrel is moved through the liquid medium, said baffle comprising a plurality of planar baffle plates whose surfaces are substantially parallel to the flow of gas through the outlet.

15. The apparatus of claim 14, wherein the surface of at least one of said baffle plates is perpendicular to the surface of at least one other of said baffle plates.

16. The apparatus of claim 15, said apparatus further comprising a reaction plate connected to the barrel and disposed outside the barrel and adjacent to the outlet so that gas escaping through the outlet impinges upon the plate.

* * * * *